United States Patent [19]

Davidson

[11] Patent Number: 5,337,587
[45] Date of Patent: Aug. 16, 1994

[54] LOCKING APPARATUS AND GRIPLESS NUT FOR SECURING QUICK RELEASE MECHANISMS

[76] Inventor: James Davidson, 6 White Oak Ct., Menlo Park, Calif. 94025

[21] Appl. No.: 919,225

[22] Filed: Jul. 27, 1992

[51] Int. Cl.⁵ .......................................... B62K 25/00
[52] U.S. Cl. ................................. 70/233; 70/225; 301/111; 280/279
[58] Field of Search .......... 411/429, 430, 910; 280/277–279, 287, 288; 301/124.2, 110, 110.5, 111; 70/57, 58, 233–236, 229–232, 209–212, 201–203

[56] References Cited

U.S. PATENT DOCUMENTS

| | | | |
|---|---|---|---|
| 4,028,915 | 6/1977 | Stahl | 70/233 |
| 4,114,409 | 9/1978 | Scire | 70/225 |
| 4,290,284 | 9/1981 | Nicksic | 70/233 |
| 4,302,045 | 11/1981 | McAdams, Sr. | 70/211 X |
| 4,668,143 | 5/1987 | Rotar | 411/910 X |
| 4,724,692 | 2/1988 | Turin et al. | 70/225 |
| 4,770,011 | 9/1988 | Constant | 70/225 |
| 4,779,434 | 10/1988 | Derman | 70/230 |
| 4,841,838 | 6/1989 | Scully et al. | 411/910 X |
| 4,951,487 | 8/1990 | Dennis | 70/233 |
| 5,005,390 | 4/1991 | Giannini et al. | 70/233 X |
| 5,027,628 | 7/1991 | DeRocher et al. | 70/233 |
| 5,071,300 | 12/1991 | McCauley | 411/910 X |
| 5,121,973 | 6/1992 | Phillips | 301/111 X |

*Primary Examiner*—Peter M. Cuomo
*Assistant Examiner*—Suzanne L. Dino
*Attorney, Agent, or Firm*—Spensley Horn Jubas & Lubitz

[57] ABSTRACT

Preferred and alternative embodiments of a locking apparatus are described for use on bicycles with quick release mechanisms on the wheels or seat. The lock consists of three attachable components, a locking platform, lock housing and bridge, and lock. When fitted together and onto the bicycle, the locking apparatus components secure the lever arm of a quick release mechanism, preventing any rotation thereof and blocking access thereto with cutting devices. A gripless nut is also provided for use on a bicycle wheel axle opposite the quick release mechanism.

18 Claims, 3 Drawing Sheets

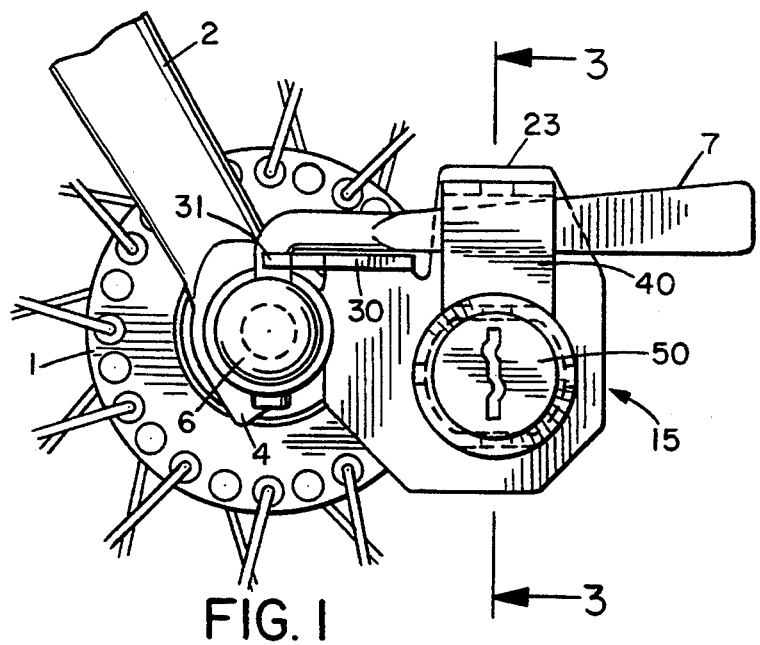
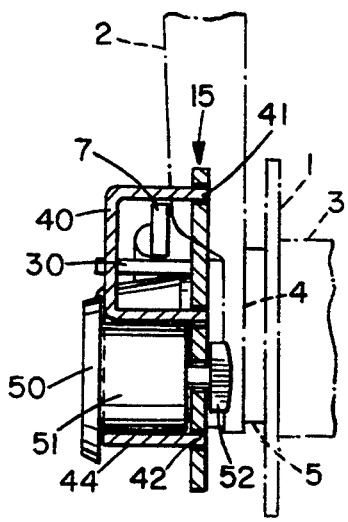
FIG. 1
FIG. 3
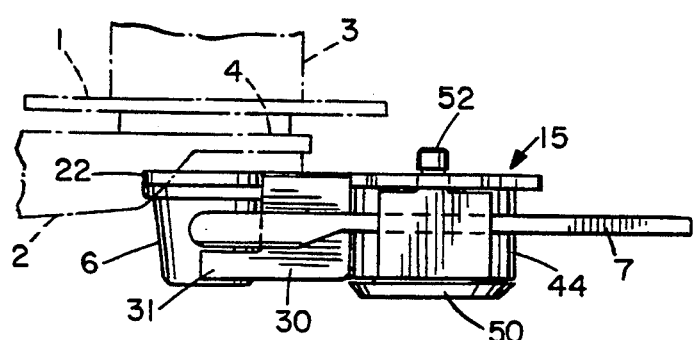
FIG. 2
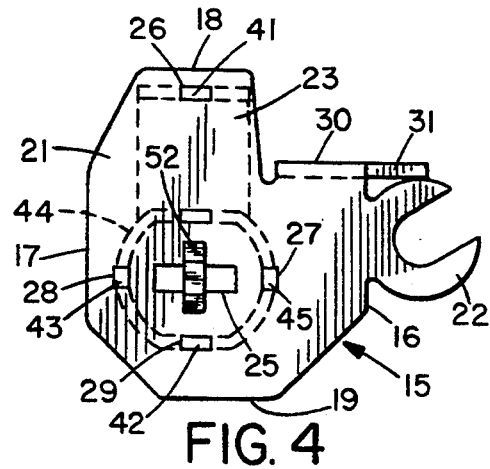
FIG. 4
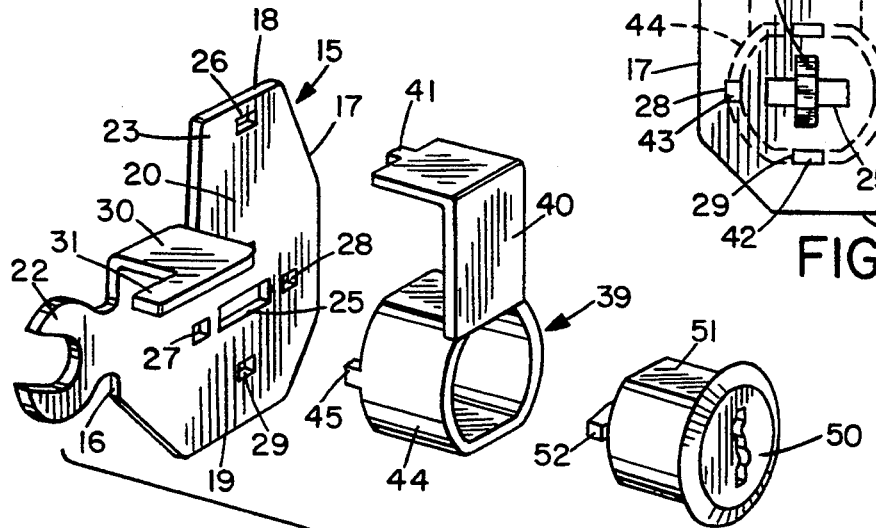
FIG. 5

LOCKING APPARATUS AND GRIPLESS NUT FOR SECURING QUICK RELEASE MECHANISMS

BACKGROUND OF THE INVENTION

1. Field of the Invention

This invention related to locks for use with quick release mechanisms used to releasably secure components together such as bicycle wheels and axles as well as bicycle seats and seat posts.

2. Description of the Related Art

It has become increasingly common in recent years for bicycles to be constructed with quick release mechanisms which allow particular components to be easily loosened or removed, in particular the wheels and seat. In simplest terms, the quick release mechanism consists of a lever which, when the lever arm is pulled to an "open" position causes a clamping nut to release so the wheel or seat can be lifted away from the axle or seat post.

Although convenient, the quick release has suffered from two drawbacks. First, if not completely "closed" the mechanism can allow the wheel or seat to work loose while the bicycle is in use. The second and more common (as well as more costly) drawback is that thieves can remove the bicycle's wheel or seat as easily as its owner can, a problem not easily overcome by conventional bicycle locks.

Varying approaches have been taken to design a lock to secure the quick release itself. However, many of these locks are, at one extreme, easily opened or broken or, at the other extreme, so difficult to attach and remove that they defeat the purpose of the quick release mechanism. Manufacturing cost has also been a concern, particularly since no quick release lock has been designed as yet which will universally fit all quick release mechanisms.

For example, U.S. Pat. No. 5,005,390 discloses a lock which is intended to partially fit over the quick release lever arm and prevent its rotation. However, this lock is somewhat difficult to attach, may be avoided by breakage of the tab which extends over the lever arm, and exposes the lever arm sufficiently to allow it to be cut through. The lock is also not universal, as it cannot be used in conjunction with recessed tangs on the bicycle frame fork which are present on many bicycles.

The lock of the present invention addresses and overcomes all of these concerns. It is simple to attach and remove, yet is highly resistant to being broken or jimmied away from the quick release. In addition, unlike certain prior art devices, the present invention also prevents thieves from avoiding the lock by breaking or cutting away the quick release lever arm or, where the wheel is involved, by prying off the nut which secures the hub opposite the quick release. Finally, the lock is universal and relatively inexpensive to manufacture.

SUMMARY OF THE INVENTION

The inventive lock consists of a locking platform having a pair of tangs which will engage the axle and front fork of a bicycle having a conventional quick release mechanism thereon. The platform is fitted with a stop which fits against the proximal end of the lever arm of said quick release mechanism to prevent rotation thereof around the axle.

A bridge and lock housing attached to the platform through slots therein. In use, the bridge will extend over the lever arm of the quick release mechanism, preventing both rotational and vertical movement thereof. The bridge also serves as a barrier to prevent avoidance of the lock by cutting the lever arm and may be reinforced. A strengthening bridge may also be provided which extends over the platform and supports the platform stop, thus restricting access to the engaging tangs protecting them from being cut or bent. A conventional key or combination lock is provided which is seated in the lock housing, securing it to the platform.

Additionally, a gripless nut is provided which is secured to the axle at its end opposite the quick release mechanism. The nut will secure the axle to the bicycle frame until the inventive lock is removed.

BRIEF DESCRIPTION OF THE DRAWINGS

FIG. 1 is a side elevational view of the lock assembly mounted on a wheel;

FIG. 2 is a top plan view of the structure of FIG. 1;

FIG. 3 is a sectional view taken on line 3—3 of FIG. 1;

FIG. 4 is a rear elevational view of the lock assembly;

FIG. 5 is an exploded perspective view of the lock assembly components;

DETAILED DESCRIPTION OF THE PREFERRED EMBODIMENTS

Figure 6:
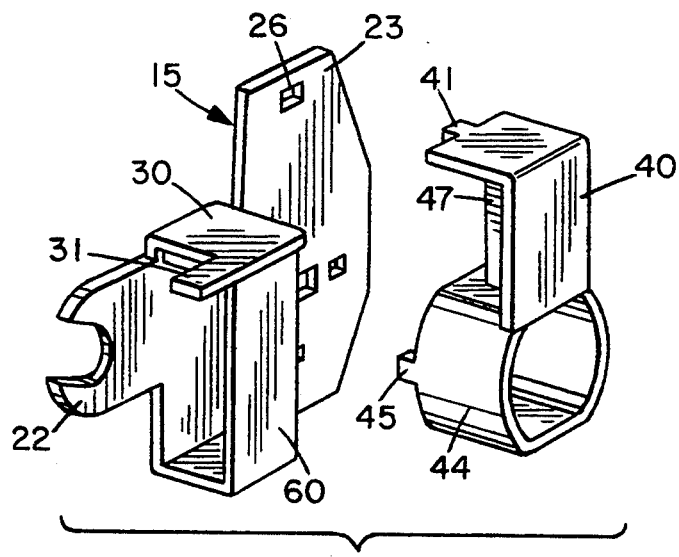
FIG. 6 is an exploded view of an alternative component configuration.

To best understand the inventive lock, a brief description of standard bicycle construction is helpful. As shown in FIG. 1, the front wheel rim 1 of a bicycle has extending perpendicularly therethrough a circular axle 3 (see, FIG. 2). The bicycle frame attaches to said axle via a pair of forks 2 (one of which is shown) the wrench-like tangs 4 of which fit around the diameter of the axle.

Conventionally, the tangs 4 of fork 2 are secured to axle 3 on one end thereof by compression of a quick release mechanism (the outer housing of which is shown at 6) against the fork and at the other end of the axle by a end nut and rod mechanism (not shown). The inner surface of the curvature formed by tangs 4 may be smooth or, as is becoming increasingly common, may be provided with an annular recession therein (see, e.g., recession 10 in FIG. 9).

Returning to FIG. 1, depicted there is a conventional bicycle fitted with the inventive lock assembly- For ease of reference, the end of the axle to which the quick release mechanism (and the inventive lock) is fitted will be referred to as the "right end" while the end fitted with the nut and rod mechanism will be referred to as the "left end", although it will be appreciated that it would be possible for the ends to be reversed on any given bicycle.

Starting then with the left end of the axle, the inventive lock is seen in FIG. 1 to be fitted to the axle between tangs 4 and quick release mechanism housing 6, with portions thereof bridging the quick release lever arm 7. The lock itself is best shown in FIG. 5.

Referring to FIG. 5, the lock is shown in exploded view and consists of platform 15, which is a substantially flat plate generally having a first side 16 second side 17, a top edge 18, a bottom edge 19, an upper surface 20 and a lower face 21 (FIG. 4). Extending outwardly from first side 16 in the same plane thereof is a pair of wrench-like tangs 22 defining a curvature which corresponds to the outer diameter of axle between point 5 on fork 2 and quick release mechanism housing 6.

Top edge 18 extends upwardly along second side 17 to form platform extension 23. Extension 23 must be slightly longer than the lever arm 7 of a conventional quick release mechanism is wide and will preferably be ½ to 1 inch in length measured from the centerpoint slot 25 in upper surface 20. This will cause extension 23 to be long enough to serve as a platform for all lever arms, but not so long as to leave enough space to insert a cutting device or wrench below bridge 40 when said bridge is attached to platform 15.

Extension 23 has a slot 26 cut therethrough, which slot corresponds in size and position to a complementary tab 41 extending downwardly from bridge 40. Other slots (25 and 27) appear in platform 15 at the approximate center of upper surface 20; all such slots extend through upper surface 20 lower surface 21. Slot 25 is representative; this slot in a manufactured lock according to this invention will be configured to accept the locking bolts of the lock to be used therein (representatively shown as 50 in FIGS. 1, 5 and 9). Slots 27–29 correspond in size and location to complementary tabs extending downwardly from lock housing 44 (one of said tabs is shown as 45 in FIG. 5).

Between tangs 22 and extension 23 on platform 15, top edge 18 extends perpendicularly from upper surface 22 to form a stop 30. Stop 30 may be any configuration, but will preferably be in a substantially "L" shape, so the horizontal extension of the "L" 31 extends over the proximal end of lever arm 7 (see, FIG. 1) when the lock is in place. Extension 31 will preferably fit against the inner curvature of tangs 4 or, where it exists, into recession 10 (see, FIG. 9). Alternatively, stop 30 may lie against or be integrally formed with bridge stop 60 (FIG. 6). In this embodiment, bridge stop 60 further reinforces stop 30, strengthens platform 15 and provides a further barrier to protect tangs 22 and platform 15 from being bent, twisted or cut. To these ends, bridge stop 60 may extend in substantially a "U" shape as shown in FIG. 6 from bottom edge 19 over upper surface 20 to and under the terminal end of stop 30, or bridge stop 60 may be a solid bar extending upwardly from face 20.

Figure 10:
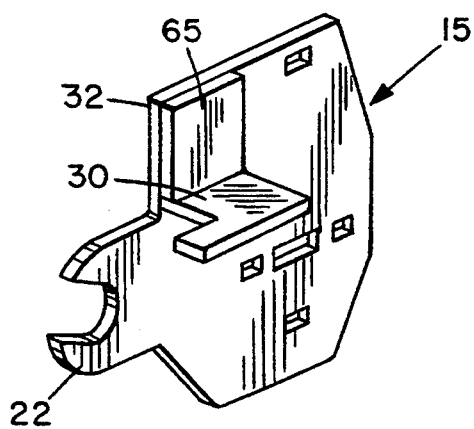
FIG. 10 is a view similar to a portion of FIG. 1, showing the lock assembly having an extended platform floor and stop thereon.
Figure 11:
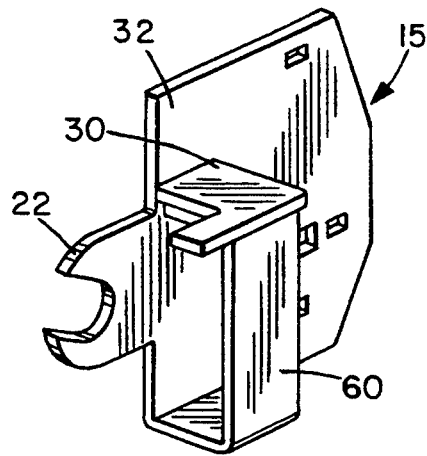
FIG. 11 is a view similar to a portion of FIG. 9, showing the lock assembly having an extended platform floor.

In any of the above-described embodiments of platform 15, side 16 of platform 15 may extend upwardly in the same plane as extension 23 to form a perpendicular floor 32 for stop 30 (FIGS. 10 and 11). Use of floor 32 further restricts access to, and torsion of, lever arm 7 when the inventive lock is in place. Preferably, floor 32 will have a raised ridge 65 thereon to serve as a stop to further prevent torsion of lever arm 7 at its thinnest point (i.e., the portion thereof where said arm attaches to quick release housing 6).

To platform 15 is fitted attachment 39. Attachment 39 consists in all embodiments of previously referred to bridge 40, bridge tab 41, lock housing 44 and lock housing tabs (representatively shown as tab 45). Bridge 40 is previously described and is welded or otherwise attached to, or integrally molded with, lock housing 44. Bridge 40 may be reinforced by block 47, which can be a thickening of bridge 40 at its horizontal extension, or a reinforcing web attached thereto.

Lock housing 44 will typically be substantially cylindrical in shape, but will be configured to accept and sheath the barrel 51 of lock 50. Lock 50 may be any key or combination lock such as the "Cylinder Lock(s) with Rotating "T", Nos. 3468-A or 1769 available from Chicago Lock Company of Chicago, Ill. Preferably, the lock chosen will have at least two flat and parallel sides to prevent rotation of the lock within lock housing 44.

When fitted together, tabs 41–45 of attachment 39 will fit into their corresponding slots 26–29 in platform 15, coupling bridge 39 and lock housing 44 thereto. Attachment 39 is secured to platform 15 by inserting lock 50 through lock housing 44 and activating the locking mechanism. An activated lock securing platform 15 and attachment 39 is depicted (in phantom) in FIG. 4, showing a representative "T" bolt 52 extending through and over slot 25.

The locking apparatus (platform 15, attachment 39 and components thereof, excluding lock 50), may be made of any rigid, lightweight metal, including carbon-impregnated metals, but will preferably be formed of a stamped or die-cast and work-hardened steel or aluminum. The maximum thickness of the metal, particularly with respect to platform 15, is dictated by the width between lockdown washer 5 and quick release housing 6 on a given bicycle model, but is preferably between 2 mm. and 5 mm., and most preferably 3 mm.

Attachment of each of the described locking apparatus embodiments to a bicycle to prevent opening of the quick release mechanism is as follows:

Tangs 22 of platform 15 of any embodiment of the locking apparatus are placed around axle 3 between point 5 on fork 2 (see FIG. 2) and quick release housing 6. Lever arm 7 is then closed (securing tangs 22 between point 5 and quick release housing 6), platform 15 will be rotated around axle 3 until lever arm 7 rests on top of stop 30 (see, FIGS. 1 and 9), and guide stop 31 is resting against the inner diameter of tangs 4 or, in the embodiment shown in FIG. 9, within recession 10 on tangs 4. In this manner, the inventive locking apparatus can be used with either unrecessed or, as is being used more frequently, recessed tangs on the front bicycle fork 2. In contrast, prior art locking apparatuses are designed only for use with unrecessed tangs and cannot, therefore, be universally used on all bicycles having quick release mechanisms, Attachment 39 is then filled by slot and tabs attachment, as previously described, to platform 15. Alternatively, the bridge and lock housing attachment 39 can be secured to platform 15 by hinge means for rotating the attachment about top edge 18 of second side 17 of platform 15. When so attached, bridge 40 will fit snugly over lever arm 7 (See FIGS. 1, 2 and 9)- Lock 50 is then inserted through lock housing 44, with its locking bit (representatively shown as "T" bar 52 in FIGS. 2 and 3) inserted through slot 25 in platform 15. The lock mechanism is then activated to secure attachment 39 to platform 15. Lock 50 may also be affixed permanently within lock housing 44. It should be noted that a "T" locking bit having sloped horizontal cross bars is preferred.

Figure 7:
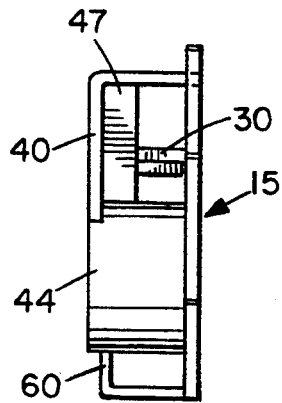
FIG. 7 is a view from the right hand side of the assembly components of FIG. 6.
Figure 8:
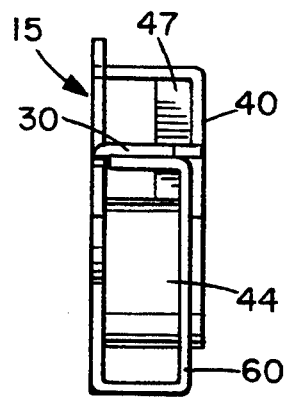
FIG. 8. is a view from the opposite side of the structure of FIG. 7.
Figure 9:
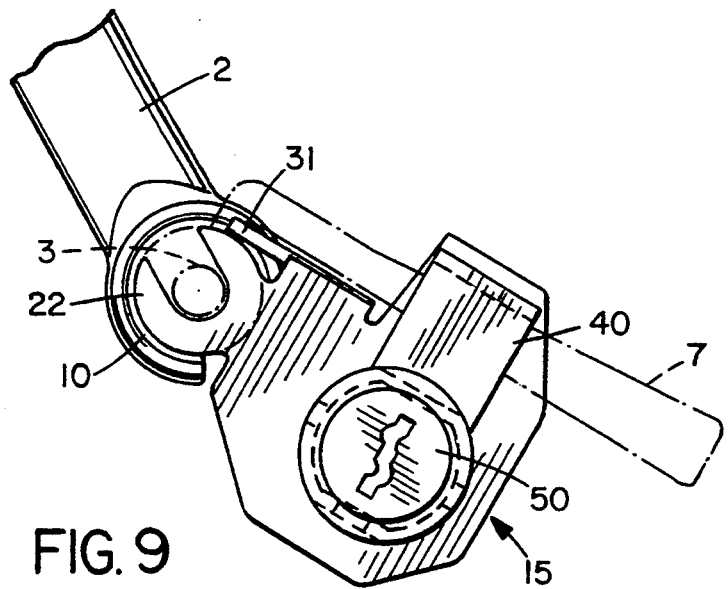
FIG. 9 is a view similar to a portion of FIG. 1, showing the lock assembly on a recessed wheel fork.

The advantages of this locking apparatus can be appreciated best by reference to FIGS. 1 and 9. As shown there, bridge 40 will prevent lever arm 7 from being rotated to an open position. Stop 30 further serves as a barrier in this respect; both bar access to lever arm 7 by cutting apparatuses. Extension 23 further prevents inward rotation of lever arm 7, as does floor 32 in the embodiment shown in FIGS. 10 and 11. Guide stop 31, which is pressed into place in tangs 4 by lever arm 7, prevents rotation of the locking apparatus. Reinforcement of all of these barriers is alternatively provided by bridge 60, and/or block 47 on bridge 40 (FIGS. 6, 7 and 8), and/or floor 32 (FIGS. 10 and 11).

Also provided is a torqueless nut for use on the right end of the axle (opposite the quick release mechanism). Conventionally, a nut mechanism is provided on the right end of the axle which secures that end to the bicycle frame. Unfortunately, if this nut is removed, the quick release mechanism on the left end of the axle and any lock applied thereto can be easily avoided. One prior art locking apparatus has attempted to avoid this result by supplying a torqueless nut to the right end of the axle, but sacrificed security to ease of attachment by providing a flat, vertical surface on the nut to allow it to be gripped while being screwed onto a rod extending from the axle.

Figure 12:
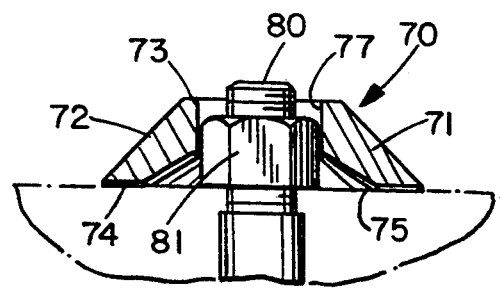
FIG. 12 is a cross-sectional view of the gripless nut attached to a bicycle axle rod.

Provided herein, therefore, is a gripless nut 70 as shown in FIG. 12. Said nut 70 has a cone-shaped hollow housing 71 designed to mate cooperatively with a conventional axle rod 80 (see, FIG. 13).

As shown in FIG. 12, housing 71 has a smooth outer surface along its wall 72 which will preferably be polished and/or coated to resist abrasion and an inner surface bearing a ridge 75 which will engage a corresponding spring structure on said bicycle when the nut is attached to the axle rod. No surfaces are provided which could be engaged by a wrench. The surfaces of wall 72 angle downwardly from upper edge 73 to parallel and lower edge 74 of nut 70 and will preferably be angled at no more than 45° from the horizontal plane of upper edge 73. Lower edge 74 is preferably ridged or otherwise toughened to engage and grip an opposing surface of said axle when in place on the axle rod. The slickness and angle of outer surface 72 also greatly hinder the application of sufficient force to the nut to remove it. Because of these properties, it is expected that nut 70 will be attached at the factory rather than by the bicycle owner and not removed during most normal uses of the bicycle.

Attachment of housing 71 to axle rod 80 may be by fitting the bore 77 of housing 71 over a threaded nut 81 attached to rod 80 or by bore 77 itself being threaded to mate cooperatively with rod 80.

Although the embodiments of the locking apparatus disclosed herein are described as being used on bicycle wheels, it will be appreciated that the lock may be used with any quick release mechanism, such as those provided on bicycle seats and car racks.

Although preferred and alternative embodiments are described herein, it will be appreciated by those skilled in the art that modifications can be made thereto without departing from the spirit or concept of the invention.

I claim:

1. A lock assembly for securing lever arm-operated quick release mechanisms, said lock assembly comprising:

a substantially flat platform having a centerpoint, first and second opposing sides, top and bottom opposing edges, upper and lower opposing surfaces, said surfaces having slots therethrough;

said first side of said platform having a portion thereof defining a pair of tangs corresponding in inner diameter to the outer diameter of a bicycle axle or seat post;

said platform further having a stop extending perpendicularly from the upper surface on said first side of said platform;

said surfaces on second side of said platform extending upwardly from said centerpoint to a length therefrom longer than the width of the lever arm of said quick release mechanism;

an attachment for said platform, said attachment consisting of a bridge and lock housing and means for joining said attachment to the slots in said platform so said attachment abuts the platform and extends therefrom in a substantially perpendicular plane thereto, said lock housing having a hollow inner diameter, joined sidewalls and opposing ends, said ends being open to define a passageway through said inner diameter, wherein the center of said inner diameter corresponds to a slot through the center point of said platform;

said bridge extending from said lock housing to substantially meet the top edge of the second side of said platform when the attachment is joined thereto to define a space closed on four sides through which the lever arm will extend when the pair of tangs are seated around the bicycle axle or seat post;

a lock substantially conforming in outer diameter to the inner diameter of said lock housing and having a locking bit corresponding in position to the slot through said centerpoint of said platform to secure the attachment to the platform.

2. A lock assembly according to claim 1 wherein said stop is in the shape of an L, the horizontal extension of which is of a length and position sufficient for said extension to contact the inner diameter of the tangs of a bicycle front fork.

3. A lock assembly according to claim 1 wherein said bridge of said attachment comprises a bight connecting two legs extending perpendicularly therefrom, said bight being reinforced in strength by reinforcing means.

4. A lock assembly according to claim 3 wherein said reinforcing means comprises a substantially solid bar extending along the length of the bight.

5. A lock assembly according to claim 1 wherein said surfaces on the first side of said platform extend upwardly to define a floor in the same plane of the extension of the second side of said platform.

6. A lock assembly according to claims 1 wherein a second bridge extends from said stop to the bottom edge of said platform.

7. A lock assembly according to claim 1 wherein said assembly is formed of work-hardened metal.

8. A lock assembly according to claim 7 wherein said metal forming said platform is between 2 millimeters and 5 millimeters in thickness.

9. A lock assembly according to claim 1 wherein said means for joining are corresponding slots and tabs.

10. A lock assembly according to claim 5 wherein a stop is formed on the upper surface of said floor.

11. A lock assembly according to any of the above claims wherein at least two opposing side walls of said lock housing are substantially flat.

12. A lock assembly according to claim 1 wherein said assembly further comprises a nut for use on a rod portion of said bicycle axle opposite said lock assembly, said nut comprising:
- a cone-shaped housing having no flat surfaces thereon, and having a hollow bore therethrough configured for mating cooperatively with the axle rod of said bicycle;
- said housing having narrow and broad parallel ends joined by sidewalls attached at an angle thereto;
- said angle at the narrow end of said housing being any angle between 10° and 70°.

13. The look assembly according to claim 12 wherein the surfaces of said cone-shaped housing are treated to resist gripping thereof.

14. The lock assembly according to claim 12 wherein said angle is 45°.

15. The lock assembly according to claim 12 wherein the surface of said lower end is toughened to engage and grip an opposing surface when said nut is attached to said axle rod.

16. The lock assembly according to claim 12 wherein said bore is threaded to mate cooperatively with said axle rod.

17. The lock assembly according to claim 12 wherein said bore is configured to fit around a hexagonal nut threaded to mate cooperatively with said axle rod.

18. A lock assembly according to claim 1 wherein said means for joining said attachment to said platform comprise hinge means coupling said bridge to the top edge of the second side of the platform.

* * * * *